US011568900B1

(12) United States Patent
Achddou et al.

(10) Patent No.: US 11,568,900 B1
(45) Date of Patent: Jan. 31, 2023

(54) INTERFACE FOR INDICATING VIDEO EDITING DECISIONS

(71) Applicant: GoPro, Inc., San Mateo, CA (US)

(72) Inventors: Thomas Achddou, Paris (FR); Renaud Cousin, Verneuil sur Seine (FR); Nicolas Duponchel, Paris (FR); Jean-Baptiste Noel, Le Vesinet (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/552,889

(22) Filed: Dec. 16, 2021

Related U.S. Application Data

(60) Provisional application No. 63/199,288, filed on Dec. 17, 2020.

(51) Int. Cl.
  *G11B 27/34* (2006.01)
  *G11B 27/031* (2006.01)
(52) U.S. Cl.
  CPC ............ *G11B 27/34* (2013.01); *G11B 27/031* (2013.01)
(58) Field of Classification Search
  None
  See application file for complete search history.

(56) References Cited

U.S. PATENT DOCUMENTS

| | | | | |
|---|---|---|---|---|
| 9,959,907 | B2* | 5/2018 | Ubillos | G11B 27/10 |
| 10,943,125 | B1* | 3/2021 | Evans | H04N 21/8549 |
| 11,030,560 | B1* | 6/2021 | Brandt | G08G 1/202 |
| 11,165,838 | B1* | 11/2021 | Schrantz | H04L 67/10 |
| 2011/0085778 | A1* | 4/2011 | Iwase | G11B 27/28 |
| | | | | 386/E5.069 |
| 2011/0289413 | A1* | 11/2011 | Ubillos | G11B 27/10 |
| | | | | 715/723 |
| 2013/0132839 | A1* | 5/2013 | Berry | G11B 27/031 |
| | | | | 715/719 |
| 2013/0332836 | A1* | 12/2013 | Cho | G11B 27/34 |
| | | | | 715/723 |
| 2015/0128048 | A1* | 5/2015 | Moffatt | G11B 27/34 |
| | | | | 715/725 |
| 2018/0307383 | A1* | 10/2018 | Faulkner | H04N 7/155 |

FOREIGN PATENT DOCUMENTS

EP 2752852 A2 * 7/2014 ........... G06F 3/0484

* cited by examiner

*Primary Examiner* — Gelek W Topgyal
(74) *Attorney, Agent, or Firm* — Esplin & Associates, PC (57) ABSTRACT

A graphical user interface for indicating video editing decisions may include an inclusion marker element, an exclusion marker element, and a selection marker element. The inclusion marker element may indicate a segment of a video that has been marked for inclusion in a video edit. The exclusion marker element may indicate a segment of the video has been marked for exclusion from the video edit. The selection marker element may indicate a segment of the video has been selected for inclusion in the video edit.

20 Claims, 5 Drawing Sheets

INTERFACE FOR INDICATING VIDEO EDITING DECISIONS

FIELD

This disclosure relates to an interface for indicating video editing decisions.

BACKGROUND

A video application may automatically generate a video edit from video clips. It may be desirable to provide to users information on inputs to the video edit generation and/or how the video edit utilized the inputs to generate the video edit.

SUMMARY

This disclosure relates to an interface for indicating video editing decisions. Video information and/or other information may be obtained. The video information may define a video having a progress length. A graphical user interface may be presented on a display. The graphical user interface may include interface elements that convey information relating to the video. The interface elements may include a timeline element that represents the progress length of the video. The interface elements may include edit decision elements that convey editing decisions made for the video to generate a video edit. The edit decision elements may include an inclusion marker element for a first segment of the progress length, an exclusion marker element for a second segment of the progress length, a selection marker element for a third segment of the progress length, and/or other edit decision elements. The inclusion marker element may indicate that the first segment of the progress length has been marked for inclusion in the video edit. The exclusion marker element may indicate that the second segment of the progress length has been marked for exclusion from the video edit. The selection marker element may indicate that the third segment of the progress length has been selected for inclusion in the video edit. The third segment of the progress length may include the first segment of the progress length and may exclude the second segment of the progress length.

A system that presents an interface for indicating video editing decisions may include one or more electronic storage, processor, and/or other components. The electronic storage may store video information, information relating to video, information relating to graphical user interface, information relating to interface elements, information relating to edit decision elements, and/or other information.

The processor(s) may be configured by machine-readable instructions.

Executing the machine-readable instructions may cause the processor(s) to facilitate presenting an interface for indicating video editing decisions. The machine-readable instructions may include one or more computer program components. The computer program components may include one or more of a video information component, a graphical user interface component, and/or other computer program components.

The video information component may be configured to obtain video information and/or other information. The video information may define a video. The video may have a progress length.

The graphical user interface component may be configured to present a graphical user interface on a display. The graphical user interface may include interface elements that convey information relating to the video. The interface elements may include a timeline element and/or other interface element. The timeline element may represent the progress length of the video. The interface elements may further include edit decision elements. The edit decision elements may convey editing decisions made for the video to generate a video edit. In some implementations, one or more of the edit decision elements may be manipulable to change one or more corresponding editing decisions.

The edit decision elements include: an inclusion marker element for a first segment of the progress length, an exclusion marker element for a second segment of the progress length, a selection marker element for a third segment of the progress length, and/or other edit decision elements. The inclusion marker element may indicate that the first segment of the progress length has been marked for inclusion in the video edit. The exclusion marker element may indicate that the second segment of the progress length has been marked for exclusion from the video edit. The selection marker element may indicate that the third segment of the progress length has been selected for inclusion in the video edit. The third segment of the progress length may include the first segment of the progress length and may exclude the second segment of the progress length.

In some implementations, the inclusion marker element and the exclusion marker element may be overlaid on top of the timeline element. Position of the inclusion marker element on the timeline element may indicate location of the first segment of the progress length. Position of the exclusion marker element on the timeline element may indicate location of the second segment of the progress length. In some implementations, the inclusion marker element may include a bar of a first color and the exclusion marker element may include a bar of a second color. The first color may be different from the second color.

In some implementations, the selection marker element may be positioned along the timeline element. Position of the selection marker element along the timeline element may indicate location of the third segment of the progress length. In some implementations, the selection marker element includes a bar of a third color. The third color may be different from the first color and the second color.

In some implementations, the interface elements may further include a flexible selection marker element for a fourth segment of the progress length. The flexible selection marker element may indicate that the fourth segment of the progress length is available for inclusion in the video edit.

In some implementations, the interface elements may further include event elements. The event elements may represent moments within the progress at which events occur. In some implementations, the event elements may include one or more manual event elements and one or more automatic event elements. A manual event element may represent a moment at which a corresponding event is manually identified. An automatic event element may represent a moment at which a corresponding event is automatically identified. A manual event element may be visually different from an automatic event element.

In some implementations, the graphical user interface may include a summary section, a zoom section, and/or other sections. The summary section may include the edit decision elements for entirety of the progress length of the video. The zoom section may include the edit decision elements for a zoomed portion of the progress length of the video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
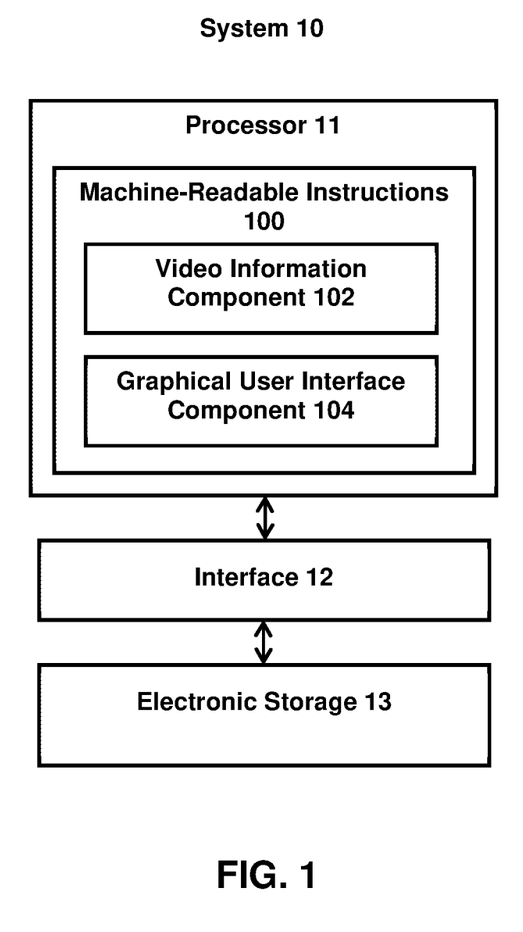
FIG. 1 illustrates a system that presents an interface for indicating video editing decisions.

FIG. 1 illustrates a system 10 that presents an interface for indicating video editing decisions. The system 10 may include one or more of a processor 11, an interface 12 (e.g., bus, wireless interface), an electronic storage 13, and/or other components. Video information and/or other information may be obtained by the processor 11. The video information may define a video having a progress length. A graphical user interface may be presented on a display by the processor 11. The graphical user interface may include interface elements that convey information relating to the video. The interface elements may include a timeline element that represents the progress length of the video. The interface elements may include edit decision elements that convey editing decisions made for the video to generate a video edit. The edit decision elements may include an inclusion marker element for a first segment of the progress length, an exclusion marker element for a second segment of the progress length, a selection marker element for a third segment of the progress length, and/or other edit decision elements. The inclusion marker element may indicate that the first segment of the progress length has been marked for inclusion in the video edit. The exclusion marker element may indicate that the second segment of the progress length has been marked for exclusion from the video edit. The selection marker element may indicate that the third segment of the progress length has been selected for inclusion in the video edit. The third segment of the progress length may include the first segment of the progress length and may exclude the second segment of the progress length.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to video, information relating to graphical user interface, information relating to interface elements, information relating to edit decision elements, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting an interface for indicating video editing decisions. The machine-readable instructions 100 may include one or more computer program components. The machine-readable instructions 100 may include one or more of a video information component 102, a graphical user interface component 104, and/or other computer program components The video information component 102 may be configured to obtain video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video information component 102 may obtain video information from one or more locations. For example, the video information component 102 may obtain information from a storage location, such as the electronic storage 13, electronic storage of information and/or signals generated by one or more sensors, electronic storage of a device accessible via a network, and/or other locations.

The video information component 102 may obtain information from one or more hardware components (e.g., an image sensor, a sound sensor) and/or one or more software components (e.g., software running on a computing device).

In some implementations, the video information component 102 may obtain video information based on user interaction with a user interface/application (e.g., video editing application, video player application), and/or other information. For example, a user interface/application may provide option(s) for a user to edit videos. The video information defining the video(s) may be obtained based on the user's selection of the video(s) through the user interface/video application. Other selections of video for retrieval of video information are contemplated.

The video information may define one or more videos. A video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers are contemplated.

Content of one or more videos may be referred to as video content. Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually.

For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The video information may define a video by including information that defines one or more content, qualities, attributes, features, and/or other aspects of the video content. For example, the video information may define a video by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

In some implementations, the video content may include spherical video content. The field of view of the visual content of spherical video content may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial sounds.

Video information may be stored within a single file or multiple files. For example, video information defining a video may be stored within a video file, multiple video files, a combination of different files (e.g., a visual file and an audio file), and/or other files. Video information may be stored in one or more formats or containers.

The graphical user interface component 104 may be configured to present one or more graphical user interfaces on one or more displays. A display may refer to an electronic device that provides visual presentation of information. A display may be configured to present visual content, graphical user interface, and/or other information. In some implementations, a display may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. A display may be a standalone device or a component of a computing device, such as a display of a mobile device (e.g., camera, smartphone, smartwatch, tablet, laptop) or a desktop device (e.g., touch monitor). User interaction with elements of the graphical user interface may be received through the display (e.g., touchscreen display) and/or other user interface devices (e.g., keyboard, mouse, trackpad).

In some implementations, the video content (visual content of video content) may be presented on one or more displays. In some implementations, one or more lower fidelity versions of the visual content may be generated for presentation on the display(s). A lower fidelity version of the visual content may refer to a version (e.g., copy) of the visual content that is reproduced with less quality than the original visual content. For example, a lower fidelity version of the visual content may include a lower resolution version of the visual content, a lower framerate version of the visual content, and/or other lower-quality version of the visual content.

A graphical user interface may refer to a user interface that enables a user to interact with the system 10 through one or more interface elements. A graphical user interface may refer to a user interface that enables the system 10 to provide information to a user through one or more interface elements. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

An interface element may refer to a graphical element of the user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., touchscreen display, keyboard, mouse, trackpad) and/or other user input. For example, a graphical user interface may present/include the interface elements in a particular arrangement and enable the user to interact with individual interface elements by engaging with locations corresponding to the individual interface elements on a touchscreen display.

A graphical user interface may include interface elements that convey information relating to the video(s). Information relating to a video may refer to information relating to content of the video (e.g., video content, visual content, audio content, highlights, metadata), information relating to usage of the video (e.g., presentation of video, recording of video, storage of video, editing of video), and/or other information relating to the video.

The interface elements may include one or more timeline elements and/or other interface element. A timeline element may refer to an interface element that visually represents the progress length (e.g., duration) of one or more videos. A timeline element may represent the progress length of one or more videos. A timeline element may represent the progress length of a single video (e.g., a separate timeline element for individual video) or multiple videos (e.g., a single timeline element to represent progress lengths of multiple videos).

The interface elements may include one or more edit decision elements. The edit decision elements may convey editing decisions made for the video(s) to generate a video edit. A video edit may refer to an arrangement and/or a manipulation of one or more portions of one or more videos. Edit decisions may refer to decision made to edit the one or more videos into a video edit. Edit decisions may include manual edit decisions (e.g., edits made by a user), automatic edit decisions (e.g., edits made by video engine/software/video editing algorithm), and/or other edit decisions. Edit decision element(s) may enable a user to see information relating to how the video(s) have and/or are being edited to generate a video edit. Edit decision element(s) may visually indicate inputs to video edit generation and/or how the video edit utilized the inputs to generate the video edit.

In some implementations, one or more of the edit decision elements may be manipulable to change one or more corresponding editing decisions. That is, a user may interact with edit decision element(s) to change the editing decision(s) represented by the edit decision element(s). For example, an edit decision element may represent a decision made to include a particular portion of a video in the video edit. The edit decision element may be manipulable by a user to change the portion of the video to be included in the video edit. An edit decision element may represent a decision made to exclude a particular portion of a video in the video edit. The edit decision element may be manipulable by a user to change the portion of the video to be excluded from the video edit. Other changes in the editing decision through manipulation of edit decision elements are contemplated.

The edit decision elements include one or more of an inclusion marker element, an exclusion marker element, a selection marker element, and/or other edit decision elements for segments of the progress length(s) of the video(s). An inclusion marker element may refer to an interface element that visually indicates which portions (segments of progress length(s)) of a video have been marked for inclusion in a video edit. That is, an inclusion marker element may indicate that a segment of a progress length of a video has been marked for inclusion in the video edit. A segment that has been marked for inclusion in a video edit may refer to a portion of the video that must/will be included in the video edit.

In some implementations, the segment of the progress length of the video may have been marked for inclusion in the video edit by a user. In some implementations, the segment of the progress length of the video may have been marked for inclusion in the video edit by video engine/software/video editing algorithm. The inclusion marker element may be positioned with respect to the timeline element to visually mark/distinguish the segment of the progress length of the video that has been marked for inclusion in the video edit.

An exclusion marker element may refer to an interface element that visually indicates which portions (segments of progress length(s)) of a video have been marked for exclusion from the video edit. That is, an exclusion marker element may indicate that a segment of a progress length of a video has been marked for exclusion from the video edit. A segment that has been marked for exclusion from the video edit may refer to a portion of the video that must/will not be included in the video edit.

In some implementations, the segment of the progress length of the video may have been marked for exclusion from the video edit by a user. In some implementations, the segment of the progress length of the video may have been marked for exclusion from the video edit by video engine/software/video editing algorithm. The exclusion marker element may be positioned with respect to the timeline element to visually mark/distinguish the segment of the progress length of the video that has been marked for exclusion from the video edit.

A selection marker element may refer to an interface element that visually indicates which portions (segments of progress length(s)) of a video have been selected for inclusion in the video edit. That is, a selection marker element may indicate that a segment of a progress length of a video has been selected for inclusion in the video edit. A segment that has been selected for inclusion in a video edit may refer to a portion of the video that are/will be included in the video edit. The selection marker element may be positioned with respect to the timeline element to visually mark/distinguish the segment of the progress length of the video that has been selected for inclusion in the video edit.

The segment indicated by the selection marker element may include one or more segments indicated by the inclusion marker element(s). The segment indicated by the selection marker element may not include any segments indicated by the exclusion marker element(s). The segment indicated by the selection marker element may exclude segment(s) indicated by the exclusion marker element(s). The presentation of the inclusion marker, the exclusion marker, and the selection marker may enable a user to quickly determine (1) which portions of the video edit include segment(s) that were marked for inclusion in the video edit, (2) which portions of the video edit include segment(s) that were neither marked for inclusion or exclusion from the video edit, and how segment(s) that were marked for exclusion from the video edit impacted the video edit. The presentation of the inclusion marker, the exclusion marker, and the selection marker may visually provide information on the make-up of the video edit, such as which portions of the video edit were required to be included in the video edit, which portions of the video edit were not required to be included in the video edit, and which portions of the video(s) were excluded from the video edit. The presentation of the inclusion marker, the exclusion marker, and the selection marker may visually provide information on how the video edit was generated (e.g., by video engine/software/video editing algorithm) based on segment(s) that were marked for inclusion in the video edit, segment(s) that were marked for exclusion from the video edit, and/or other information.

For example, video engine/software/video editing algorithm may select portions of video(s) to be included in a video. For instance, video engine/software/video editing algorithm may utilize one or more rules to include interesting segments within the video(s) in the video edit. The video engine/software/video editing algorithm may utilize inclusion and exclusion markings to determine which segments must be or must not be included in the video edit. The video engine/software/video editing algorithm may automatically determine which segments of the video(s) that are not marked (for inclusion, for exclusion) will be included in the video edit. For instance, video engine/software/video editing algorithm may utilize video content analysis, highlight detection, music synchronization, and/or other video selection/rejection techniques to determine which non-marked segments of the video(s) will be included in the video edit.

In some implementations, the interface elements may further include one or more event elements. An event element may refer to an interface element that visually indicates location of event(s) within a video. An event element may represent a moment (e.g., point in time, duration of time) within the progress length of the video at which an event (e.g., event of interest) occurs. An event element may be positioned with respect to the timeline element to visually mark/distinguish the moment corresponding to the event.

In some implementations, different types of event elements may represent different types of events. For example, an event element representing an event of a particular type may be different from an event element representing an event of another type. Event element representing different types of events may be visually different.

In some implementations, different types of event elements may represent differently identified events. For example, the event elements may include one or more manual event elements and one or more automatic event elements. A manual event element may represent a moment at which a corresponding event is manually identified.

For instance, a manual event element may represent a moment at which a corresponding event is manually identified by a user during or capture of the video. An automatic event element may represent a moment at which a corresponding event is automatically identified (e.g., based on video content analysis, based on video metadata). A manual event element may be visually different from an automatic event element.

Figure 3A:
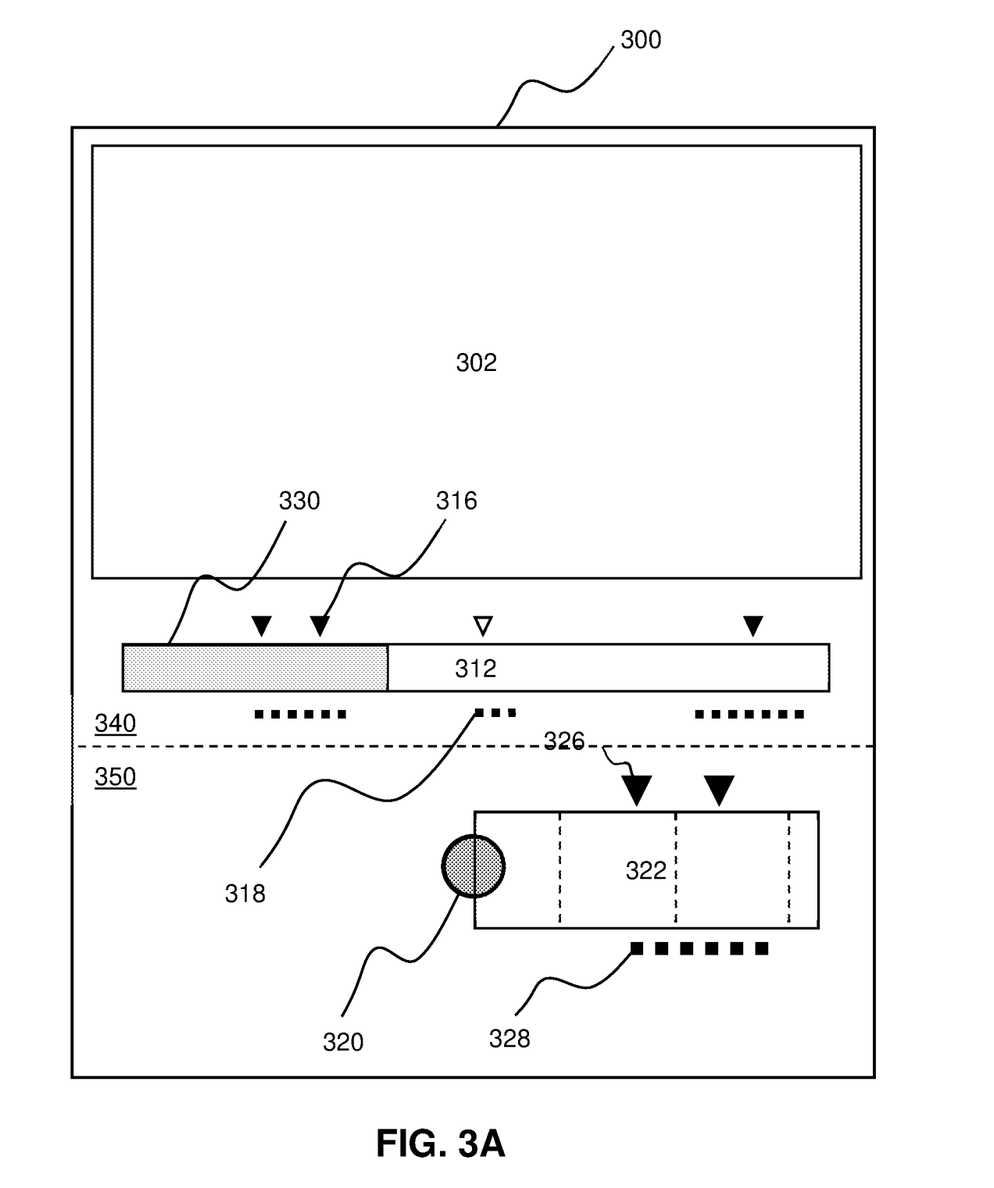
FIG. 3A illustrates example graphical user interface for indicating video editing decisions.
Figure 3B:
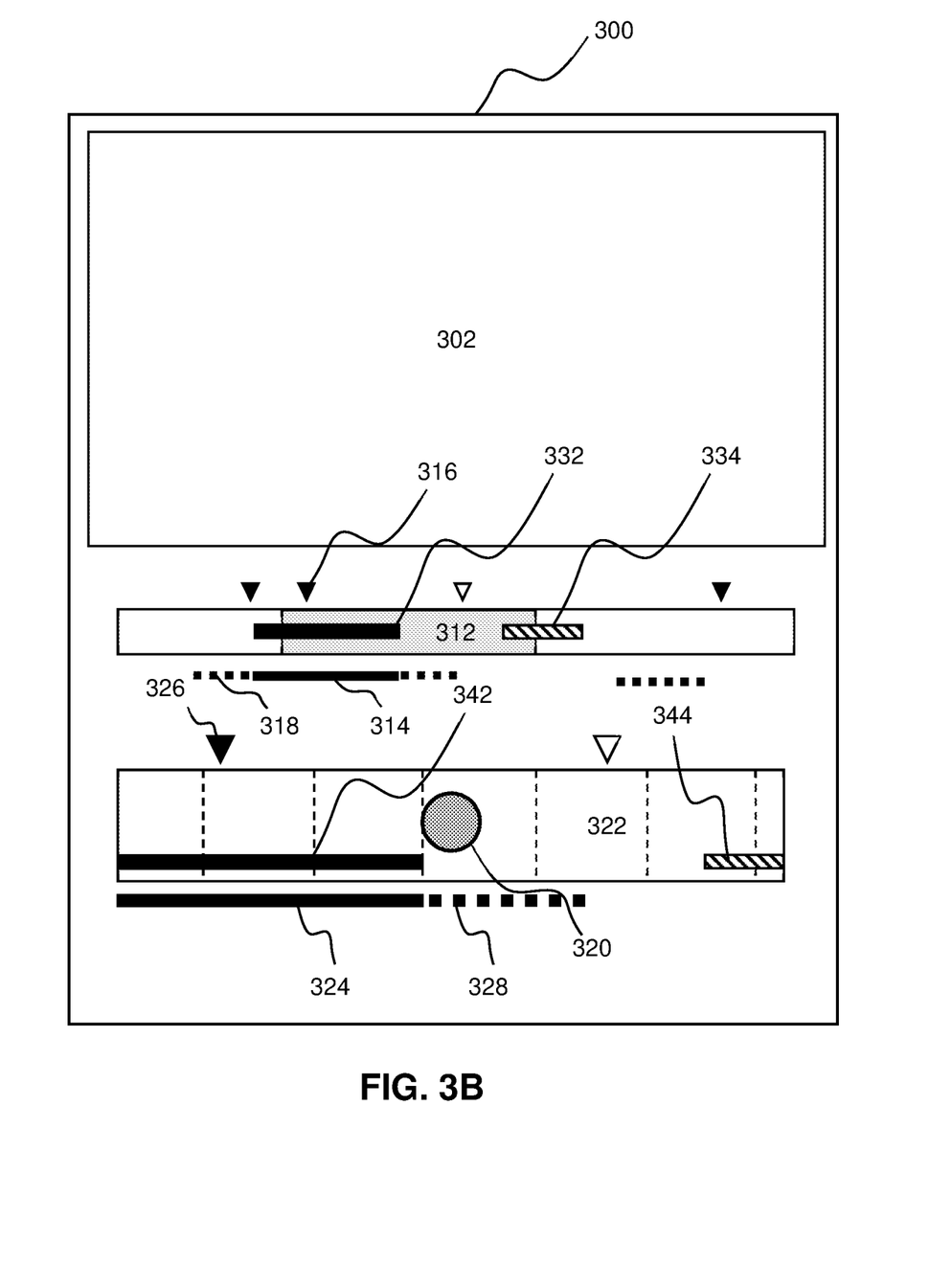
FIG. 3B illustrates example graphical user interface for indicating video editing decisions.
Figure 3C:
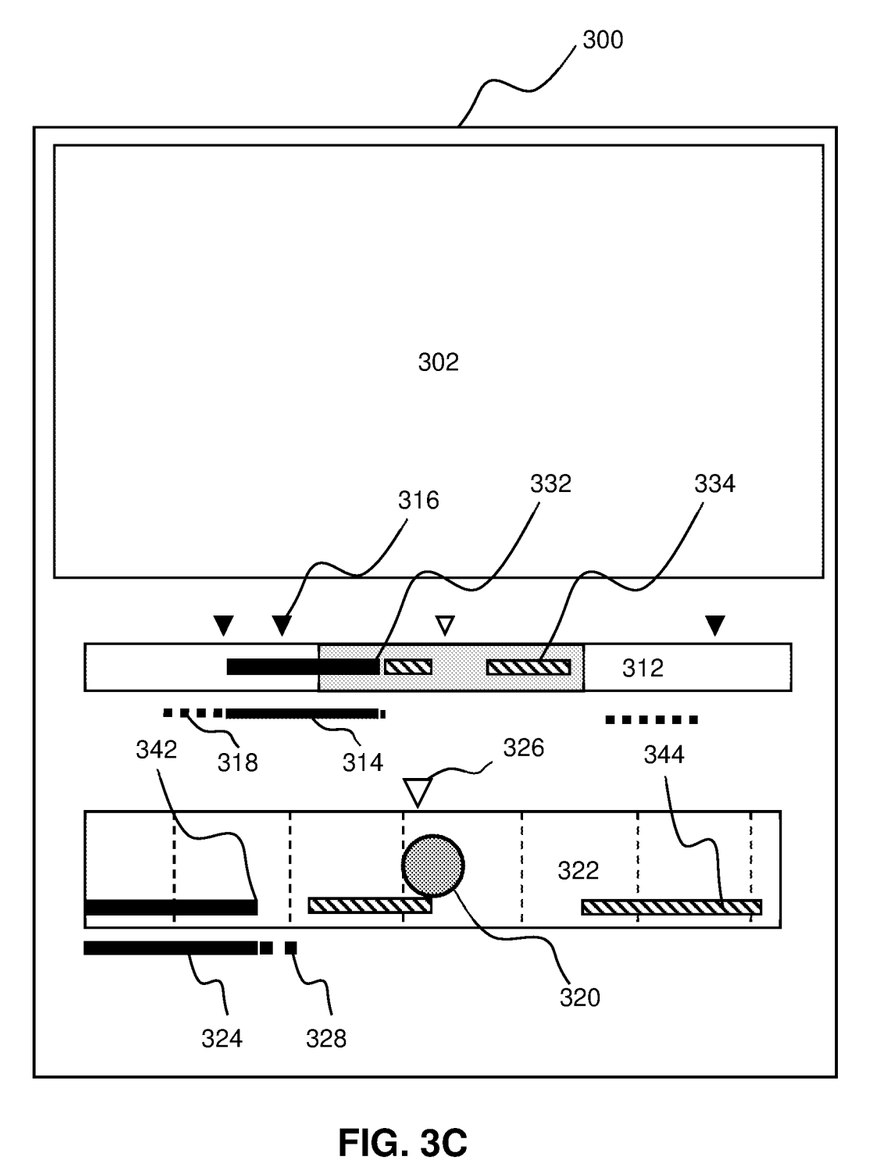
FIG. 3C illustrates example graphical user interface for indicating video editing decisions.

FIGS. 3A, 3B, and 3C illustrates example graphical user interface 300 for indicating video editing decisions. The views of graphical user interface 300 are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 3A, 3B, and 3C.

Referring to FIG. 3A, the graphical user interface 300 may include a visual content playback portion 302. The visual content playback portion 302 may include presentation of video content (visual content of the video content). The graphical user interface 300 may include a timeline element 312. The timeline element may represent the progress length of the video being edited. The timeline element 312 may represent the entirety of the progress length(s). The timeline element 312 may provide summary visualization of user's decision to include and/or exclude segments of the progress length in the video edit (e.g., via inclusion marker element 332 and the exclusion marker elements 334 shown in FIG. 3B). The summary of segment selections made for inclusion in the video edit (e.g., via the processor 11/video engine/software/video editing algorithm based on user decision to include and/or exclude segments and/or highlights/events in the video) may be presented adjacent to (e.g., below) the timeline element 312.

The graphical user interface 300 may include a summary section 340, a zoom section 350, and/or other sections. The summary section 340 may visually provide information relating to the video for the entire progress length of the video. The summary section 340 may include edit decision elements, event elements, and/or other interface elements for entirety of the progress length of the video. The summary section 340 may provide a global view of editing decisions for the video. The zoom section 350 may visually provide information relating to the video for a zoomed portion of the progress length of the video. The zoom section 350 may include edit decision elements, event elements, and/or other interface elements for a zoomed portion of the progress length of the video. The zoom section 350 may provide a zoomed view of editing decisions for the video.

For example, in FIG. 3A, zoom section 350 may include a zoomed timeline element 322. The zoomed timeline element 322 may represent a zoomed portion of the progress length of the video being edited. The portion of the progress length represented by the zoomed timeline element 322 may be indicated via zoomed portion element 330 overlaid on top of the timeline element 312. In some implementations, the zoomed portion element 330 may be a scroller, and user may move the zoomed portion element 330 along the timeline element 312 to change the portion of the progress length represented by the zoomed timeline element 322. In some implementations, the zoomed timeline element 322 may include previews of the visual content included within the video (e.g., video frame thumbnails). A current moment element 320 may be overlaid on top of the zoomed timeline element 322. The current moment element 320 may visually represent current moment of the video content being presented within the visual content playback portion 302.

The graphical user interface 300 may include event elements 316, 326. The event element 316, 326 may represent moments within the progress length of the video at which events occur. The event elements 316 may be positioned with respect to the timeline element 312 to visually mark/distinguish the moments corresponding to the events. The event elements 326 may be positioned with respect to the zoomed timeline element 322 to visually mark/distinguish the moments corresponding to the events. The presentation of the event elements 326 may enable a user to readily understand location of moments in which events occur in the video and whether such moments are marked for inclusion in the video edit and/or marked for exclusion from the video edit. The event elements 316, 326 may include different visual features to distinguish between manually marked events and automatically marked events. For example, darker event elements may indicate manually marked events while lighter event element may indicate automatically marked events. As another example, event elements may have different colors, different shapes, and/or other different visual features to distinguish between manually marked events and automatically marked events. The event elements 316, 326 may be positioned above the timeline element 312 and the zoomed timeline element 322. Other placement of the event element 316, 326 are contemplated.

The graphical user interface 300 may include selection marker elements 314, 324. The selection marker elements 314, 324 may indicate segments of the progress length of the video that have been selected (e.g., via the processor 11/video engine/software/video editing algorithm) for inclusion in the video edit. The selection marker element 314, 324 may be positioned along the timeline element 312 and the zoomed timeline element 322. The position of the selection marker element 314, 324 along the timeline element 312 and the zoomed timeline element 322 may indicate location and/or length of the segment(s) of the progress length that have been selected for inclusion in the video edit. The selection marker element 314, 324 may span from one end of the selected segment(s) to the other end of the selected segment(s). Other placement of the selection marker elements are contemplated.

In FIG. 3B, the graphical user interface 300 may include inclusion marker elements 332, 342 and the exclusion marker elements 334, 344. The inclusion marker elements 332, 342 may indicate segments of the progress length of the video that have been marked for inclusion in the video edit. The inclusion marker elements 332, 342 may be overlaid on top of the timeline element 312 and the zoomed timeline element 322. The position of the inclusion marker elements 332, 342 on the timeline element 312 and the zoomed timeline element 322 may indicate location and/or length of the segment(s) of the progress length that have been marked for inclusion in the video edit.

The inclusion marker elements 332, 342 may span from one end of the marked segment(s) to the other end of the marked segment(s). Other placement of the inclusion marker elements are contemplated.

The exclusion marker elements 334, 344 may indicate segments of the progress length of the video that have been marked for exclusion from the video edit. The exclusion marker elements 334, 344 may be overlaid on top of the timeline element 312 and the zoomed timeline element 322.

The position of the exclusion marker elements 334, 344 on the timeline element 312 and the zoomed timeline element 322 may indicate location and/or length of the segment(s) of the progress length that have been marked for exclusion from the video edit. The exclusion marker elements 334, 344 may span from one end of the marked segment(s) to the other end of the marked segment(s). Other placement of the exclusion marker elements are contemplated.

The inclusion marker elements 332, 342, the exclusion marker elements 334, 344, and/or the selection marker elements 314, 324 may include different visual features to distinguish between segments that have been marked for inclusion in the video edit, segments that have been marked for exclusion from the video edit, and/or segments that have been selected for inclusion in the video edit. For example, the inclusion marker elements 332, 342, the exclusion marker elements 334, 344, and the selection marker elements 314, 324 may have different colors, different shading, different shapes, and/or other different visual features to distinguish between different segments of the video edit. For instance, in FIG. 3A, the inclusion marker elements 332, 342, the exclusion marker elements 334, 344, and the selection marker elements 314, 324 may include bars of different colors (e.g., green bar for inclusion marker elements 332, 342, red bar for exclusion marker elements 334, 344, blue bar for selection marker elements 314, 324).

The graphical user interface 300 may include a flexible selection marker elements 318, 328. The flexible selection marker elements 318, 328 may indicate segments of the progress length of the video that is available for inclusion in the video edit. The flexible section marker element 318, 328 may indicate segments of the progress length of the video that may be automatically added (e.g., via the processor 11/video engine/software/video editing algorithm) to the video edit. In some implementations, the segments may be added to the video edit to keep the video edit synchronized to music. The flexible selection marker elements 318, 328 may indicate segments of the progress length of the video into which the video edit may grow to keep the video edit synced with music.

A user may interact with the graphical user interface 300 to change marking of segments for inclusion in and/or exclusion from the video edit. For example, a user may interact with the graphical user interface 300 to mark a new segment for inclusion in the video segment, change marking of a segment marked for inclusion in the video edit, and/or remove marking of a segment marked for inclusion in the video edit. Aa user may interact with the graphical user interface 300 to mark a new segment for exclusion from the video segment, change marking of a segment marked for exclusion from the video edit, and/or remove marking of a segment marked for exclusion from the video edit. A user's change of segment marking may change which segments of the video are selected for inclusion in the video edit. That is, as the user changes the inclusion marker elements 332, 342 and the exclusion marker elements 334, 344, the selection of the segments for inclusion in the video edit may be changed and reflected by changes in the selection marker elements 314, 324.

For example, FIG. 3C may show the graphical user interface 300 with addition of an exclusion marker element. A user may have interacted with the graphical user interface 300 to add a new exclusion marker element (between existing inclusion marker element and exclusion marker element). The additional marking of the segment to be excluded from the video edit may change selection of segments for inclusion in the video edit. For instance, in FIG. 3C. the length of the left selection marker elements 314, 324 may be shortened so that the selected segment does not include the excluded segments.

In some implementations, a user may interact with the current moment element 320 and/or the zoomed timeline element 322 to change marking of segments for inclusion in and/or exclusion from the video edit. For example, the current moment element 320 may allow a user to draw segments to include or exclude in a video edit. A user may interact with the current moment element 320 to set the marking mode to inclusion marking mode or exclusion marking mode. After selection of the mode, the user may move the zoomed timeline element 322 to select the segment that will be marked with the selected mode (e.g., mark for inclusion, mark for exclusion). The segment of the progress length that moves across the current moment element 320 may be marked with the selected mode. For instance, in FIG. 3C, a user may have selected exclusion mode via interaction with the current moment element 320. After selection of the exclusion mode, the user may have pushed the zoomed timeline element 322, and the segment of the progress length that moved across the current moment element 320 may be marked with the exclusion marker element. The current moment element 320 may visually change to indicate whether inclusion marking mode or exclusion marking mode is active. The current moment element 320 may allow a user to change decisions to include or exclude a segment in a video edit. The current moment element 320 may visually indicate whether it is over a segment that has been previously marked by a user for inclusion in or exclusion from the video edit. Other changes in marking of segments for inclusion in and/or exclusion from the video edit are contemplated.

In some implementations, one or more features of the graphical user interface 300 may be enabled and/or disabled for a segment of the video based on whether the segment has been marked for inclusion in the video edit, marked for exclusion from the video edit, and/or selected for inclusion in the video edit. For example, the graphical user interface may include features to edit video. Video editing features may be enabled for segments of the video that have been marked for inclusion in the video edit while the video edit features may be disabled for segments of the video that have not been marked for inclusion in the video edit (e.g., segments marked for exclusion from the video edit, segments that have been automatically selected for inclusion in the video edit). As another example, video editing features may be enabled for segments of the video that have been selected for inclusion in the video edit while the video edit features may be disabled for segments of the video that have not been selected for inclusion in the video edit. Other provision of features by the graphical user interface based on marking/selection of video segments are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10.

External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
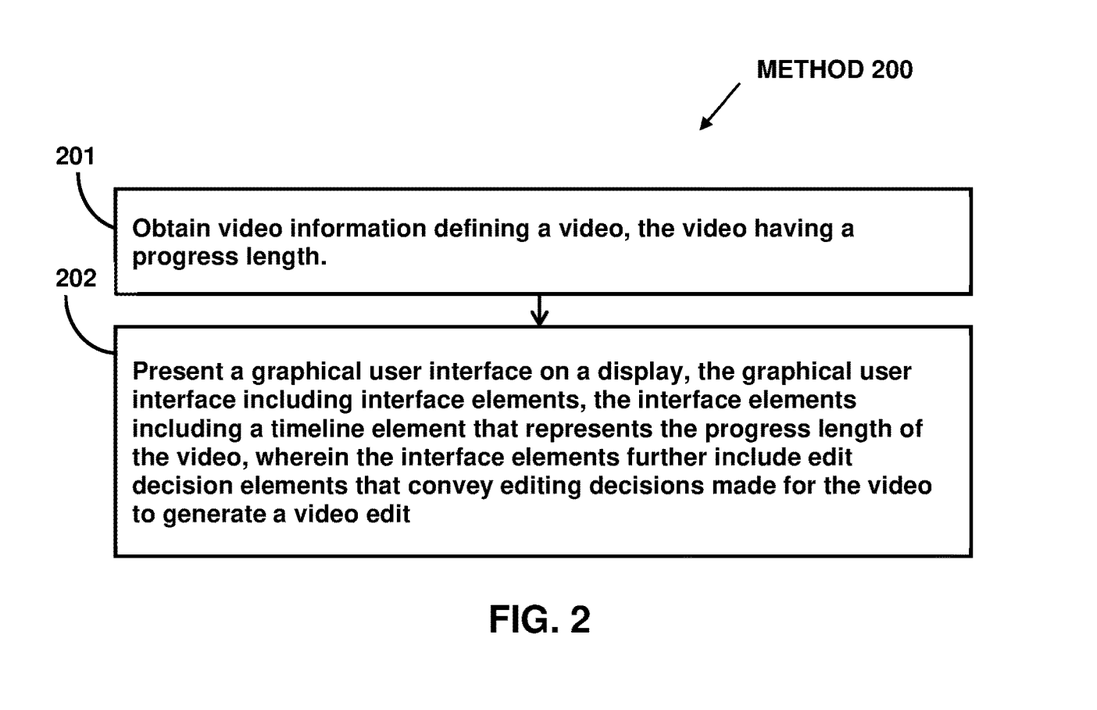
FIG. 2 illustrates a method for presenting an interface for indicating video editing decisions.

FIG. 2 illustrates method 200 for presenting an interface for indicating video editing decisions. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information and/or other information may be obtained. The video information may define a video having a progress length. In some implementations, operation 201 may be performed by a processor component the same as or similar to the video information component 102 (Shown in FIG. 1 and described herein).

At operation 202, a graphical user interface may be presented on a display. The graphical user interface may include interface elements that convey information relating to the video. The interface elements may include a timeline element that represents the progress length of the video. The interface elements may include edit decision elements that convey editing decisions made for the video to generate a video edit. The edit decision elements may include an inclusion marker element for a first segment of the progress length, an exclusion marker element for a second segment of the progress length, a selection marker element for a third segment of the progress length, and/or other edit decision elements. The inclusion marker element may indicate that the first segment of the progress length has been marked for inclusion in the video edit. The exclusion marker element may indicate that the second segment of the progress length has been marked for exclusion from the video edit. The selection marker element may indicate that the third segment of the progress length has been selected for inclusion in the video edit. The third segment of the progress length may include the first segment of the progress length and may exclude the second segment of the progress length. In some implementations, operation 202 may be performed by a processor component the same as or similar to the graphical user interface component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting an interface for indicating video editing decisions, the system comprising:
one or more physical processors configured by machine-readable instructions to:
obtain video information defining a video, the video having a progress length; and
present a graphical user interface on a display, the graphical user interface including interface elements that convey information relating to the video, the interface elements including a timeline element that represents the progress length of the video, wherein the interface elements further include edit decision elements that convey editing decisions for the video made by a user or a video software to generate a video edit, the editing decisions for the video by the user or the video software including marking of segments of the progress length for inclusion or exclusion from the video edit, wherein segments of the progress length that are or will be included in the video edit is determined based on the editing decisions for the video, wherein the edit decision elements include:
an inclusion marker element for a first segment of the progress length, the inclusion marker element indicating that the first segment of the progress length has been marked for inclusion in the video edit by the user or the video software;
an exclusion marker element for a second segment of the progress length, the exclusion marker element indicating that the second segment of the progress length has been marked for exclusion from the video edit by the user or the video software; and
a selection marker element for a third segment of the progress length, the selection marker element indicating that the third segment of the progress length has been included or will be included in the video edit, wherein the third segment of the progress length includes the first segment of the progress length and excludes the second segment of the progress length;

wherein presentation of the inclusion marker element, the exclusion marker element, and the selection marker element enables determination of the video edit including one or more portions of the video based on marking of segments for inclusion in the video edit, the video edit excluding one or more portions of the video based on marking of segments for exclusion from the video edit, and the video edit including or excluding one or more portions of the video based on non-marking of segments for inclusion in or exclusion from the video edit.

2. The system of claim 1, wherein the inclusion marker element and the exclusion marker element are overlaid on top of the timeline element, position of the inclusion marker element on the timeline element indicating location of the first segment of the progress length and position of the exclusion marker element on the timeline element indicating location of the second segment of the progress length.

3. The system of claim 2, wherein the inclusion marker element includes a bar of a first color and the exclusion marker element includes a bar of a second color, the first color different from the second color.

4. The system of claim 3, wherein the selection marker element is positioned along the timeline element, position of the selection marker element along the timeline element indicating location of the third segment of the progress length.

5. The system of claim 4, wherein the selection marker element includes a bar of a third color, the third color different from the first color and the second color.

6. The system of claim 1, wherein the interface elements further include event elements, the event elements representing moments within the progress length at which events occur.

7. The system of claim 6, wherein the event elements include a manual event element and an automatic event element, the manual event element representing a moment at which a corresponding event is manually identified, the automatic event element representing a moment at which a corresponding event is automatically identified, the manual event element visually different from the automatic event element.

8. The system of claim 1, wherein the interface elements further include a flexible selection marker element for a fourth segment of the progress length, the flexible selection marker element indicating that the fourth segment of the progress length is available for automatic inclusion in the video edit to grow the vide edit and synchronize the video edit with music, wherein the fourth segment does not include segments marked for inclusion in the video edit or segments marked for exclusion from the video edit.

9. The system of claim 1, wherein the graphical user interface includes a summary section and a zoom section separate from the summary section, the summary section including the edit decision elements for entirety of the progress length of the video, and the zoom section including the edit decision elements for a zoomed portion of the progress length of the video.

10. A method for presenting an interface for indicating video editing decisions, the method performed by a computing system including one or more processors, the method comprising:

obtaining, by the computing system, video information defining a video, the video having a progress length; and presenting, by the computing system, a graphical user interface on a display, the graphical user interface including interface elements that convey information relating to the video, the interface elements including a timeline element that represents the progress length of the video, wherein the interface elements further include edit decision elements that convey editing decisions for the video made by a user or a video software to generate a video edit, the editing decisions for the video by the user or the video software including marking of segments of the progress length for inclusion or exclusion from the video edit, wherein segments of the progress length that are or will be included in the video edit is determined based on the editing decisions for the video, wherein the edit decision elements include:

an inclusion marker element for a first segment of the progress length, the inclusion marker element indicating that the first segment of the progress length has been marked for inclusion in the video edit by the user or the video software;

an exclusion marker element for a second segment of the progress length, the exclusion marker element indicating that the second segment of the progress length has been marked for exclusion from the video edit by the user or the video software; and a selection marker element for a third segment of the progress length, the selection marker element indicating that the third segment of the progress length has been included or will be included in the video edit, wherein the third segment of the progress length includes the first segment of the progress length and excludes the second segment of the progress length;

wherein presentation of the inclusion marker element, the exclusion marker element, and the selection marker element enables determination of the video edit including one or more portions of the video based on marking of segments for inclusion in the video edit, the video edit excluding one or more portions of the video based on marking of segments for exclusion from the video edit, and the video edit including or excluding one or more portions of the video based on non-marking of segments for inclusion in or exclusion from the video edit.

11. The method of claim 10, wherein the inclusion marker element and the exclusion marker element are overlaid on top of the timeline element, position of the inclusion marker element on the timeline element indicating location of the first segment of the progress length and position of the exclusion marker element on the timeline element indicating location of the second segment of the progress length.

12. The method of claim 11, wherein the inclusion marker element includes a bar of a first color and the exclusion marker element includes a bar of a second color, the first color different from the second color.

13. The method of claim 12, wherein the selection marker element is positioned along the timeline element, position of the selection marker element along the timeline element indicating location of the third segment of the progress length.

14. The method of claim 13, wherein the selection marker element includes a bar of a third color, the third color different from the first color and the second color.

15. The method of claim 10, wherein the interface elements further include event elements, the event elements representing moments within the progress length at which events occur.

16. The method of claim 15, wherein the event elements include a manual event element and an automatic event element, the manual event element representing a moment at which a corresponding event is manually identified, the automatic event element representing a moment at which a corresponding event is automatically identified, the manual event element visually different from the automatic event element.

17. The method of claim 10, wherein the interface elements further include a flexible selection marker element for a fourth segment of the progress length, the flexible selection marker element indicating that the fourth segment of the progress length is available for automatic inclusion in the video edit to grow the vide edit and synchronize the video edit with music, wherein the fourth segment does not include segments marked for inclusion in the video edit or segments marked for exclusion from the video edit.

18. The method of claim 10, wherein the graphical user interface includes a summary section and a zoom section separate from the summary section, the summary section including the edit decision elements for entirety of the progress length of the video, and the zoom section including the edit decision elements for a zoomed portion of the progress length of the video.

19. A system for presenting an interface for indicating video editing decisions, the system comprising:

one or more physical processors configured by machine-readable instructions to:

obtain video information defining a video, the video having a progress length; and present a graphical user interface on a display, the graphical user interface including interface elements that convey information relating to the video, the interface elements including a timeline element that represents the progress length of the video, wherein the interface elements further include edit decision elements that convey editing decisions for the video made by a user or a video software to generate a video edit, the editing decisions for the video by the user or the video software including marking of segments of the progress length for inclusion or exclusion from the video edit, wherein segments of the progress length that are or will be included in the video edit is determined based on the editing decisions for the video, wherein the edit decision elements include:

an inclusion marker element for a first segment of the progress length, the inclusion marker element indicating that the first segment of the progress length has been marked for inclusion in the video edit by the user or the video software;

an exclusion marker element for a second segment of the progress length, the exclusion marker element indicating that the second segment of the progress length has been marked for exclusion from the video edit by the user or the video software; and a selection marker element for a third segment of the progress length, the selection marker element indicating that the third segment of the progress length has been included or will be included in the video edit, wherein the third segment of the progress length includes the first segment of the progress length and excludes the second segment of the progress length;

wherein presentation of the inclusion marker element, the exclusion marker element, and the selection marker element enables determination of the video edit including one or more portions of the video based on marking of segments for inclusion in the video edit, the video edit excluding one or more portions of the video based on marking of segments for exclusion from the video edit, and the video edit including or excluding one or more portions of the video based on non-marking of segments for inclusion in or exclusion from the video edit; and wherein the graphical user interface includes a summary section and a zoom section separate from the summary section, the summary section including the edit decision elements for entirety of the progress length of the video, and the zoom section including the edit decision elements for a zoomed portion of the progress length of the video.

20. The system of claim 19, wherein the interface elements further include a flexible selection marker element for a fourth segment of the progress length, the flexible selection marker element indicating that the fourth segment of the progress length is available for automatic inclusion in the video edit to grow the vide edit and synchronize the video edit with music, wherein the fourth segment does not include segments marked for inclusion in the video edit or segments marked for exclusion from the video edit.

* * * * *